(12) United States Patent
Kruempelmann et al.

(10) Patent No.: US 12,475,087 B2
(45) Date of Patent: Nov. 18, 2025

(54) DEPLOYMENT OF CONFIGURATION DATA IN PARALLEL TO ACTIVE TEST USAGE

(71) Applicant: SAP SE, Walldorf (DE)

(72) Inventors: Wulf Kruempelmann, Altlussheim (DE); Dominik Ofenloch, Lampertheim (DE)

(73) Assignee: SAP SE, Walldorf (DE)

( * ) Notice: Subject to any disclaimer, the term of this patent is extended or adjusted under 35 U.S.C. 154(b) by 3 days.

(21) Appl. No.: 18/609,319

(22) Filed: Mar. 19, 2024

(65) Prior Publication Data

US 2025/0298778 A1    Sep. 25, 2025

(51) Int. Cl.
| | |
|---|---|
| *G06F 16/21* | (2019.01) |
| *G06F 16/22* | (2019.01) |
| *G06F 16/23* | (2019.01) |
| *G06F 16/25* | (2019.01) |

(52) U.S. Cl.
CPC ........ *G06F 16/213* (2019.01); *G06F 16/2282* (2019.01); *G06F 16/2358* (2019.01); *G06F 16/252* (2019.01)

(58) Field of Classification Search
None
See application file for complete search history.

(56) References Cited

U.S. PATENT DOCUMENTS

| | | | | |
|---|---|---|---|---|
| 10,789,220 | B2 * | 9/2020 | Mayer | G06F 16/21 |
| 10,891,273 | B2 * | 1/2021 | Mayer | G06F 16/22 |
| 10,936,624 | B2 * | 3/2021 | Kruempelmann | G06F 16/27 |
| 11,416,509 | B2 * | 8/2022 | Patel | G06F 40/205 |
| 12,038,907 | B1 * | 7/2024 | Gosain | G06F 16/90 |
| 2004/0177063 | A1 * | 9/2004 | Weber | G06F 16/41 |
| 2018/0137010 | A1 * | 5/2018 | Mayer | G06F 11/1451 |
| 2018/0137145 | A1 * | 5/2018 | Mayer | G06F 16/22 |
| 2018/0285390 | A1 * | 10/2018 | Mayer | G06F 16/25 |
| 2019/0050213 | A1 * | 2/2019 | Schanafelt | G06F 21/62 |
| 2019/0377820 | A1 * | 12/2019 | Kruempelmann | G06F 16/27 |
| 2020/0349176 | A1 * | 11/2020 | Daimler | G06F 16/335 |
| 2025/0139066 | A1 * | 5/2025 | Eberlein | G06F 8/71 |
| 2025/0209742 | A1 * | 6/2025 | Richwagen | G01C 21/3867 |

OTHER PUBLICATIONS

Preserving mapping consistency under schema changes (Year: 2004).*
Map Projections (Year: 2014).*

* cited by examiner

*Primary Examiner* — Kim T Nguyen
(74) *Attorney, Agent, or Firm* — Mintz Levin Cohn Ferris Glovsky and Popeo, P.C.

(57) ABSTRACT

One or more applications access a first set of database tables via a first projection view mapping from a first name to a second name. At a given point in time, the one or more applications may detect an indication of a modification operation targeting the first set of database tables. In response to detecting the indication of the modification operation, the one or more applications may create a second set of database tables for storing results of the modification operation. In response to detecting a completion of the modification operation, the first projection view may be remapped from the first name to a third name, where the third name is associated with the second set of database tables. Then, the one or more applications may access the second set of database tables via the first projection view mapping from the first name to the third name.

18 Claims, 11 Drawing Sheets

DEPLOYMENT OF CONFIGURATION DATA IN PARALLEL TO ACTIVE TEST USAGE

TECHNICAL FIELD

The present disclosure generally relates to deploying configuration data in an enterprise resource planning system.

BACKGROUND

An application can be hosted by a cloud platform such that the application can be remotely accessible to multiple tenants, for example, over the Internet. For example, the application can be available as a cloud-based service including, for example, a software as a service (SaaS) and/or the like. Many organizations rely on such cloud-based enterprise software applications including, for example, enterprise resource planning (ERP) software, customer relationship management (CRM) software, and/or the like. These enterprise software applications may provide a variety of functionalities including, for example, invoicing, procurement, payroll, time and attendance management, recruiting and onboarding, learning and development, performance and compensation, workforce planning, and/or the like. Settings, stored as tables, can define processes executable by the ERP and the CRM systems. Customization of settings using a staging table can involve a complex activation process that can conflict with some processes executed by the ERP and the CRM systems.

The configuration data in a modern ERP system may be spread over 25,000 tables, as the master data may be spread over 50,000 tables. The deployment of a complex scenario may take several hours or up to one day. During this time, many tables are attached and not synchronized. Accordingly, the system cannot be used during this time.

SUMMARY

In some implementations, one or more applications (e.g., a first application, a second application) access a first set of database tables via a first projection view mapping from a first name to a second name. At a given point in time, the one or more applications may detect an indication of a modification operation targeting the first set of database tables. In response to detecting the indication of the modification operation, the one or more applications may create a second set of database tables for storing results of the modification operation. In response to detecting a completion of the modification operation, the first projection view may be remapped from the first name to a third name, where the third name is associated with the second set of database tables. Then, the one or more applications may access the second set of database tables via the first projection view mapping from the first name to the third name.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In modern enterprise resource planning (ERP) systems, the application programs are decoupled from a database using a view layer. In these systems, the application software operates on the database using database views. These database views normally correspond 1:1 to the application tables. But in special cases, it is possible to redirect the data to different tables or define special operations on these data.

In a common ERP scenario, a set of tables holds a business configuration, and periodically, this set of tables will be updated. Various approaches will be described herein for performing these business configuration updates. In one approach, the set of tables defining a business's configuration ("configuration data") for a given system is cloned, both the structures and the content. The new tables follow a given naming convention by adding the prefix MOD_ to the table names. These new tables, with the prefix MOD, may be referred to herein as the "mod tables".

In the view layer, projection views may be defined, which differ between usernames accessing the tables. The normal users (i.e., standard users) get read access to the tables. This allows the normal users to read all data. The application software uses this standard user to access the data. The result will be that the configuration data can be read, and the data can be used for testing the processes and the software.

If another user accesses the data, the other user access is redirected to the mod tables, where the data can be read and written. The application software will be changed, so that the deploy process uses a secondary database connection using a different user to access the data. Together with the redirection within the view layer, the deploy process will work directly on the mod tables and change, insert, and update the configuration data.

When the deploy process is finished, the view layer is switched to use the mod tables for the normal application software and the normal users. This may be accomplished using just a flag in one control database table. Now, the application software uses within milli-seconds the new set of configuration data. A new test cycle of the configuration may start. For the next external deployment, the naming convention of the new tables may be switched to MOD2_. For subsequent deployments, the naming convention of the new tables may be switched to MOD3_, MOD4, and so on.

Figure 1:
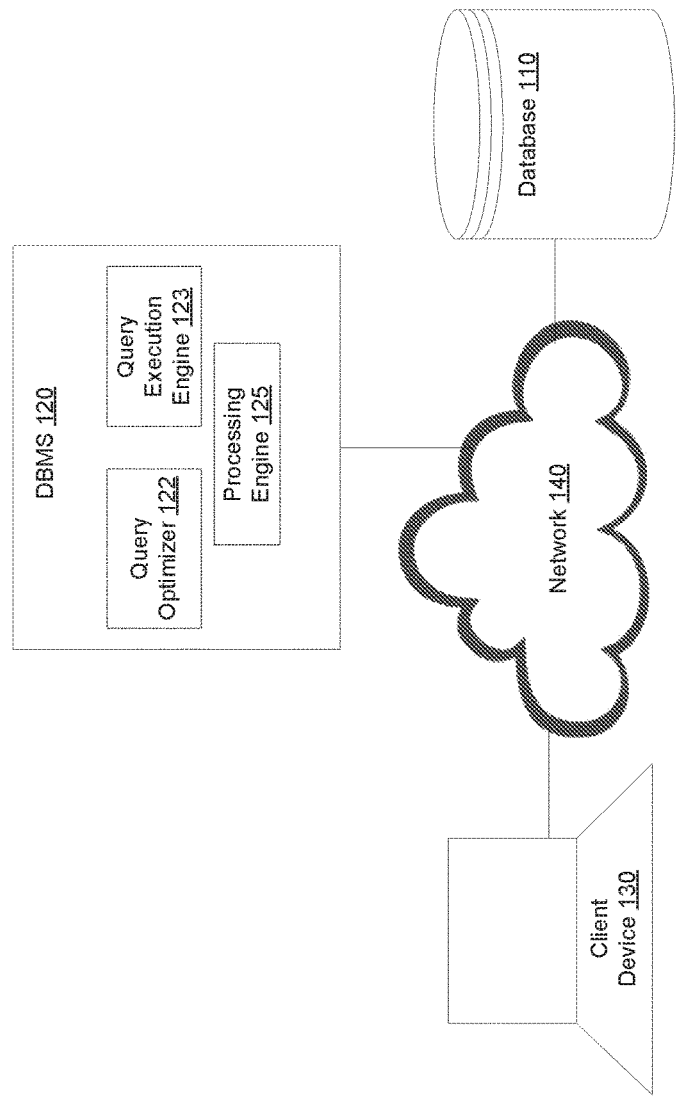
FIG. 1 illustrates a logical diagram of an example of a computing apparatus, in accordance with some example implementations of the current subject matter.

FIG. 1 depicts an example of a computing system 100, in accordance with some example embodiments. Referring to FIG. 1, the computing system 100 may include a database 110, a database management system (DBMS) 120, and a client device 130. In an example, database management system 120 includes a query optimizer 122, query execution engine 123, and processing engine 125. In other examples, database management system 120 may include other suitable arrangements of components. It is noted that while only a single database 110 and a single client device 130 are shown, this is merely to avoid cluttering the figure. It should be appreciated that database 110 is representative of any number of databases 110 and client device 130 is representative of any number of client devices that may included as part of computing system 100.

From an application or client perspective, it can be extremely cumbersome to access databases such as database 110. For example, an application may need to query different types of databases using complex queries. As a consequence, the application layer in this example would need to be configured to handle the various types of databases and the various query types. Additionally or alternatively, each database 110 may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database 110 and may thus reduce the performance and response times for queries on that database layer.

In some example implementations, there may be provided a query execution engine 123 and/or processing engine 125 that may decouple the higher-level, application layer from the database layer (e.g., the persistence or storage layer where data including database tables may be stored and/or queried using instructions, such as commands and/or the like). The query execution engine 123 and/or processing engine 125 may be implemented separately from the database layer and/or the application layer. Further, the query execution engine 123 and/or processing engine 125 may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The database 110, the database management system 120, and the client device 130 may be communicatively coupled via a network 140. In some example embodiments, the database 110 may be a relational database. However, it should be appreciated that the database 110 may be any type of database including, for example, an in-memory database, a hierarchical database, an object database, an object-relational database, and/or the like. For example, instead of and/or in addition to being a relational database, the database 110 may be a graph database, a column store, a key-value store, a document store, and/or the like.

The database management system 120 may be configured to respond to requests from one or more client devices including, for example, the client device 130. For example, as shown in FIG. 1, the client device 130 may communicate with the database management system 120 via the network 140, which may be any wired and/or wireless network including, for example, a public land mobile network (PLMN), a wide area network (WAN), a local area network (LAN), a virtual local area network (VLAN), the Internet, and/or the like. The client device 130 may be a processor-based device including, for example, a smartphone, a tablet computer, a wearable apparatus, a virtual assistant, an Internet-of-Things (IoT) appliance, and/or the like.

Figure 2:
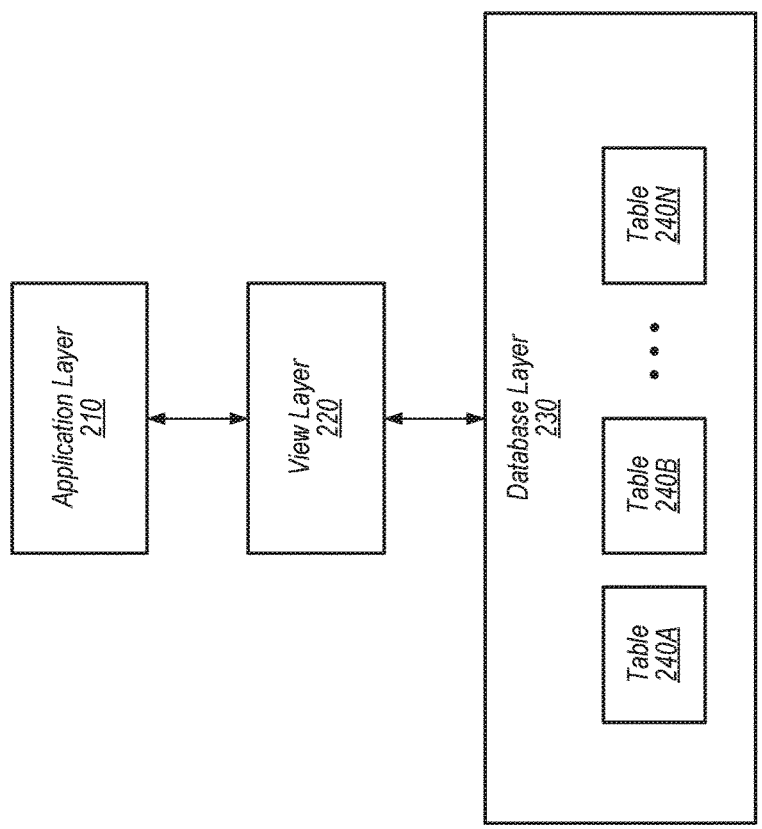
FIG. 2 illustrates a logical block diagram of a database system, in accordance with some example implementations of the current subject matter.

Turning now to FIG. 2, a logical block diagram of a database system 200 is shown, in accordance with one or more embodiments of the current subject matter. As shown, database system 200 includes application layer 210, view layer 220, and database layer 230. Application layer 210 includes any number of software applications that are executing on one or more computing systems. Database layer 230 includes any number of database tables 240A-N, with table 240A, table 240B, and table 240N shown in FIG. 2. These tables 240A-N are representative of any number and type of database tables. View layer 220 links the application layer 210 to the data in the database layer 230. In this manner, reads and writes to the database from application layer 210 will pass through view layer 220. Accordingly, view layer 220 decouples the direct data from the application software. View layer 220 may include view logic which includes or accesses a database schema in order to access tables 240A-N of database layer 230. The view logic may include instructions (e.g., rules, definitions, code, script, and/or the like) that can define how to handle the access to the database layer 230 and retrieve the desired data from the database layer 230.

Configuration data for a given business or organization may be stored as a set of tables in the database layer 230. When the configuration data is being updated, a new set of tables are created. During deployment, these new set of tables (i.e., the mod tables) can be accessed and filled with data. First, the original tables are copied. All the modification methods are run to fill the mod tables. Once all of the data is filled in the mod tables, the name of the original tables is redefined in the projection views of view layer 220. And then work can be performed on the new, modified tables in milliseconds.

If there is a second system with a view layer, the view layer of the second system can be joined to the mod tables of the first system 200 such that the view layer directly accesses the mod tables. And the application server logic in the second system may fill the mod tables. Then the view layer of the second system is rebuilt. Also, the view layer 220 of the first system 200 can have the tables renamed in the view layer 220.

Figure 3:
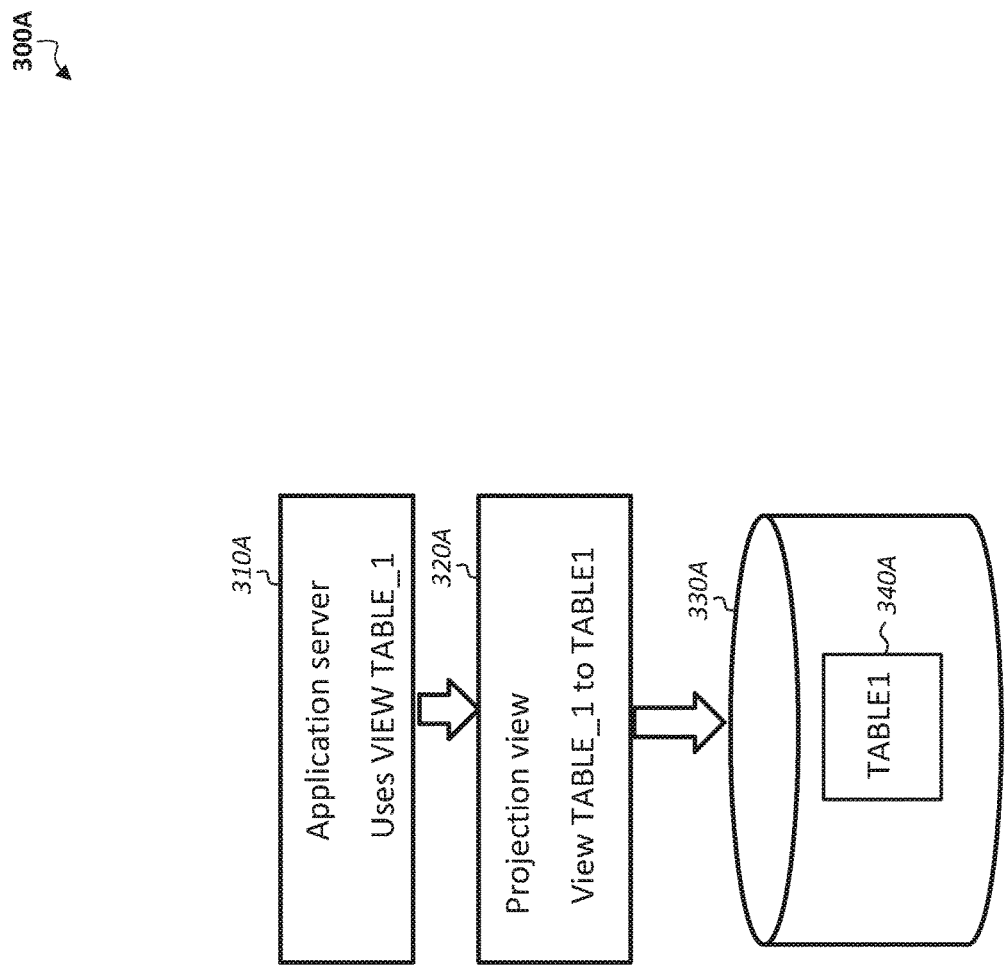
FIG. 3 illustrates a logical diagram of the access scheme of a database system at a first point in time, in accordance with some example implementations of the current subject matter.

Referring now to FIG. 3, a logical diagram of the access scheme of a database system 300A at a first point in time is shown, in accordance with one or more embodiments of the current subject matter. Application server 310A accesses a set of database tables 340A (labeled "TABLE1") of database 330A through projection view 320A. Application server 310A uses view "TABLE_1" to target the set of database tables 340A, and projection view 320A remaps "TABLE_1" to "TABLE1". In other words, projection view 320A projects the view "TABLE_1" to "TABLE1".

Figure 4:
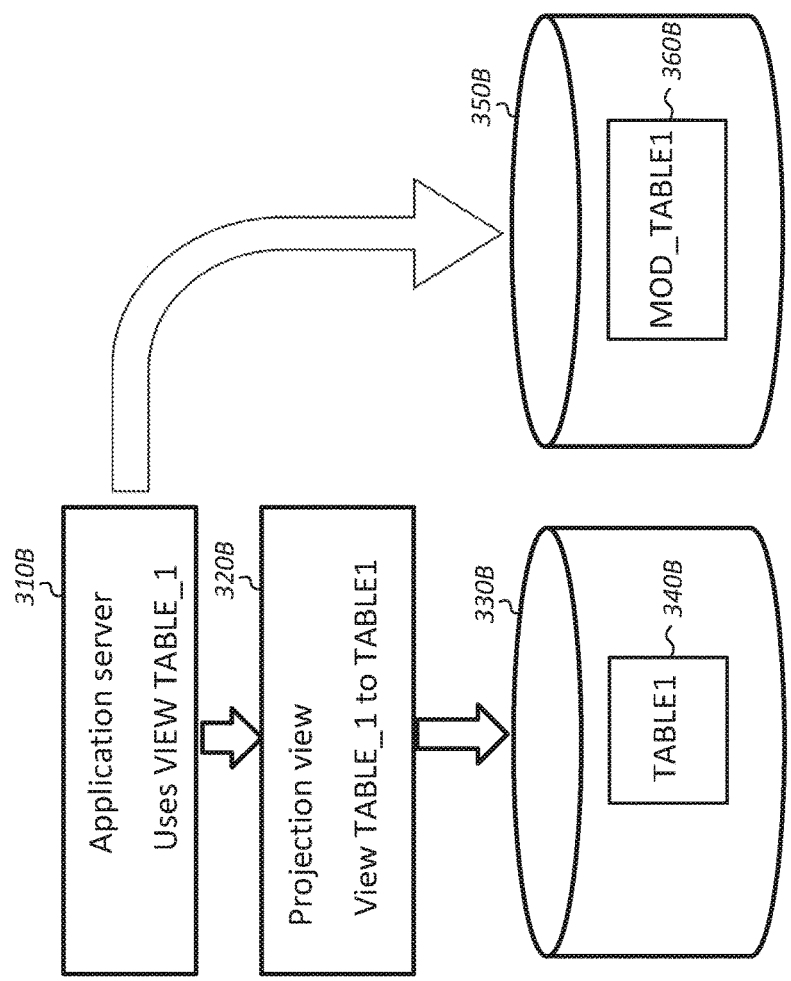
FIG. 4 illustrates a logical diagram of the access scheme of a database system at a second point in time, in accordance with some example implementations of the current subject matter.

Turning now to FIG. 4, a logical diagram of the access scheme of a database system 300B at a second point in time is shown, in accordance with one or more embodiments of the current subject matter. Database system 300B represents database system 300A at a second point in time subsequent to the first point in time shown in FIG. 3. Accordingly, application server 310B represents application server 310A (of FIG. 3) at a later point in time, projection view 320B represents projection view 320A (of FIG. 3) at a later point in time, and database 330B represents database 330A (of FIG. 3) at a later point in time.

It is assumed for the purposes of this discussion that prior to the second point in time, database system 300B has detected an indication that a modification operation will be performed on the set of database tables 340B (labeled "TABLE1"). In an example, the modification operation is a part of lifecycle management process. In other examples, the modification operation may be part of other types of processes.

In order to implement the modification operation, a second set of tables 360B, labeled "MOD_TABLE1" are created. The second set of tables 360B, labeled "MOD_TABLE1", are shown in database 350B, which may be the same database as database 330B or may be a different database from database 330B. As part of the modification operation, the data from the first set of database tables 340B (labeled "TABLE1") will be copied to the second set of database tables 360B (labeled "MOD_TABLE1"). The modification operation is then performed to the second set of database tables 360B. In an example, the prefix "MOD_" is added to the table name of the original set of database tables 340B to indicate that tables 360B are a modified version of tables 340B. Alternatively, a suffix of "_MOD" could be added to the original table name to indicate that these are a modified set of tables. In other embodiments, other ways of indicating that the second set of tables 360B are a modified version of the first set of tables 340B may be utilized. While the modification operation is being performed, accesses from application server 310B may continue to be performed to the first set of database tables 340B via projection view 320B.

In an example, application server 300B directly accesses the modified set of database tables (labeled "MOD_TABLE1") for the lifecycle management procedure. This allows application server 300B to access the modified set of database tables for the lifecycle management procedure without affecting the original set of database tables 340B (labeled "TABLE1"). In another example, shown in FIG. 5, application server 310B accesses the set of tables 360B (labeled "MOD_TABLE1") through projection view 520B. This is in contrast to the example of FIG. 4 where application server 310B directly accessed the set of tables 360B (labeled "MOD_TABLE1"). It is noted that either embodiment, with or without projection view 520B, may be implemented. The other components (e.g., application server 310B, projection view 320B, database 330B, set of tables 340B, database 350B) of FIG. 5 are the same as shown in FIG. 4, with application server 310B continuing to have access to the original set of tables 340B through projection view 320B.

Figure 5:
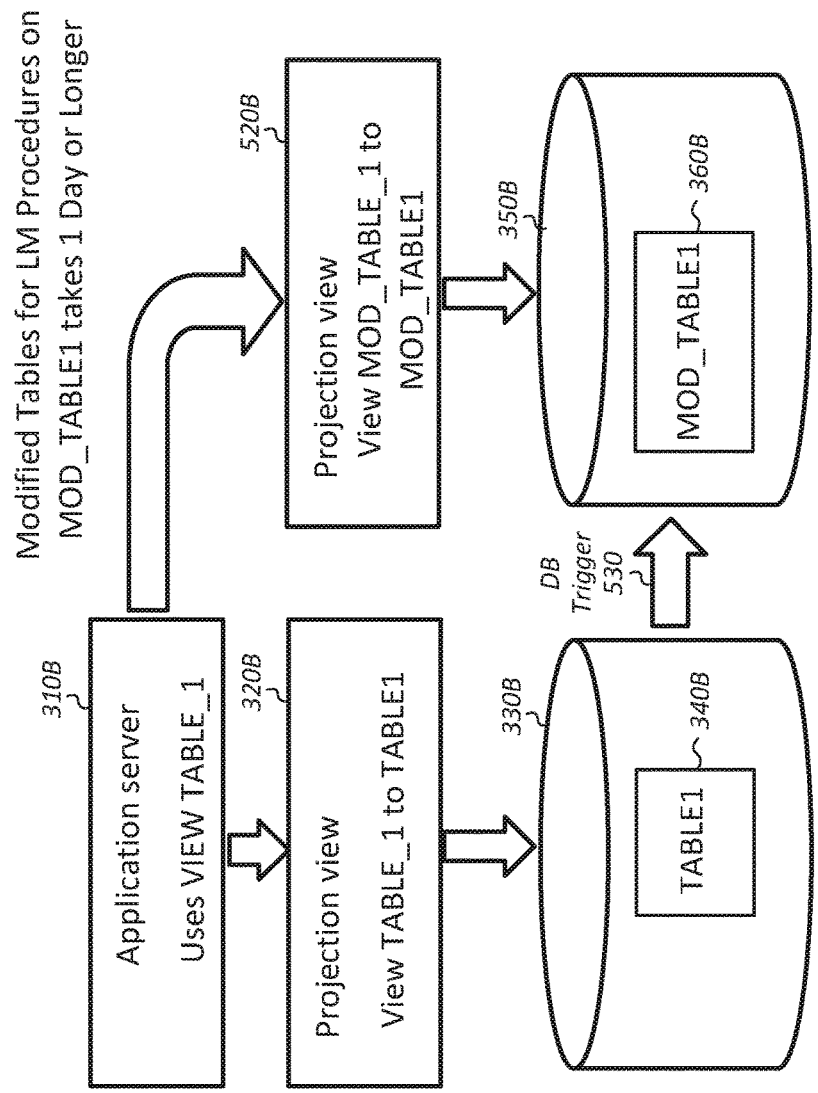
FIG. 5 illustrates a logical diagram of another access scheme of a database system at a second point in time, in accordance with some example implementations of the current subject matter.

In the example illustrated in FIG. 5, a database trigger 530 may be built which copies any changes made to "TABLE1" to "MOD_TABLE1". For example, if there are changes to "TABLE1" while the modification operation of "MOD_TABLE1" is ongoing, then the database trigger 530 may copy the changes from "TABLE1" to "MOD_TABLE1", to ensure that these changes are correctly reflected in "MOD_TABLE1". In other words, if, during the modification operation, application server 310B directly writes to the original set of database tables "TABLE1" via projection view 320B, the database trigger 530 will modify the modified set of tables "MOD_TABLE1" on the other side.

Figure 6:
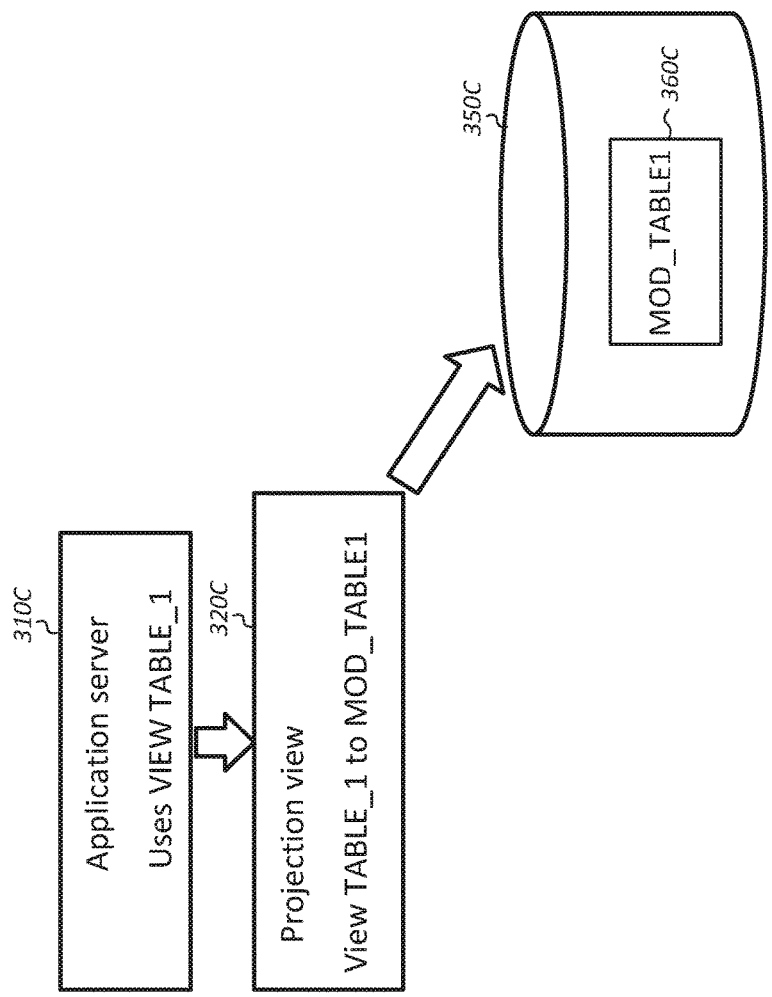
FIG. 6 illustrates a logical diagram of a database system after the original set of tables have been modified, in accordance with some example implementations of the current subject matter.

Turning now to FIG. 6, a logical diagram of a database system 300C after the original set of tables have been modified is shown, in accordance with one or more embodiments of the current subject matter. Database system 300C is intended to represent database system 300B (of FIG. 4) at a later point in time. Accordingly, application server 310C represents application server 310B (of FIG. 4) at a later point in time, projection view 320C represents projection view 320B (of FIG. 4) at a later point in time, database 350C represents database 350B (of FIG. 4) at a later point in time, and the modified set of tables 360C (or "MOD_TABLE1") represents modified set of tables 360B at a later point in time. Alternatively, database system 300C represents database system 500 (of FIG. 5) at a later point in time, in embodiments where application server 310B operates on the modified set of tables 360B via a separate projection view 520B.

At the point in time represented in FIG. 6 for database system 300C, the modification operation to the original set of database tables 340A (of FIG. 3) has been completed. Accordingly, once the modification operation has finished, projection view 320C may be updated so that the identifier "TABLE_1" maps to "MOD_TABLE1". This allows application server 310C to continue to use the original name "TABLE_1" of the original set of database tables 340A, with "TABLE_1" being mapped to the name "MOD_TABLE1" by projection view 320C. This causes queries targeting "TABLE_1" to be routed the modified set of tables 360C. This is a seamless operation that allows the applications and code of application server 310C to continue execution without having to be modified. Previously, application server 310C did not have access to the database tables 340B (of FIG. 5) during the modification operation for the lifecycle management process, with the modification operation sometimes taking a day or longer to be performed. However, with the new approach, application server 310C can continue to have access to the database tables 340B while the modification operation is ongoing without experiencing any downtime.

Additionally, for future business configuration updates, the previously described process for cloning tables and then modifying the cloned tables may be repeated. The next version of the tables may be referred to with a "MOD2" prefix to differentiate from the "MOD" prefix for tables 360C. For subsequent versions of the tables, a "MOD3" prefix may be used, then a "MOD4" prefix, then a "MOD5" prefix, and so on.

Figure 7:
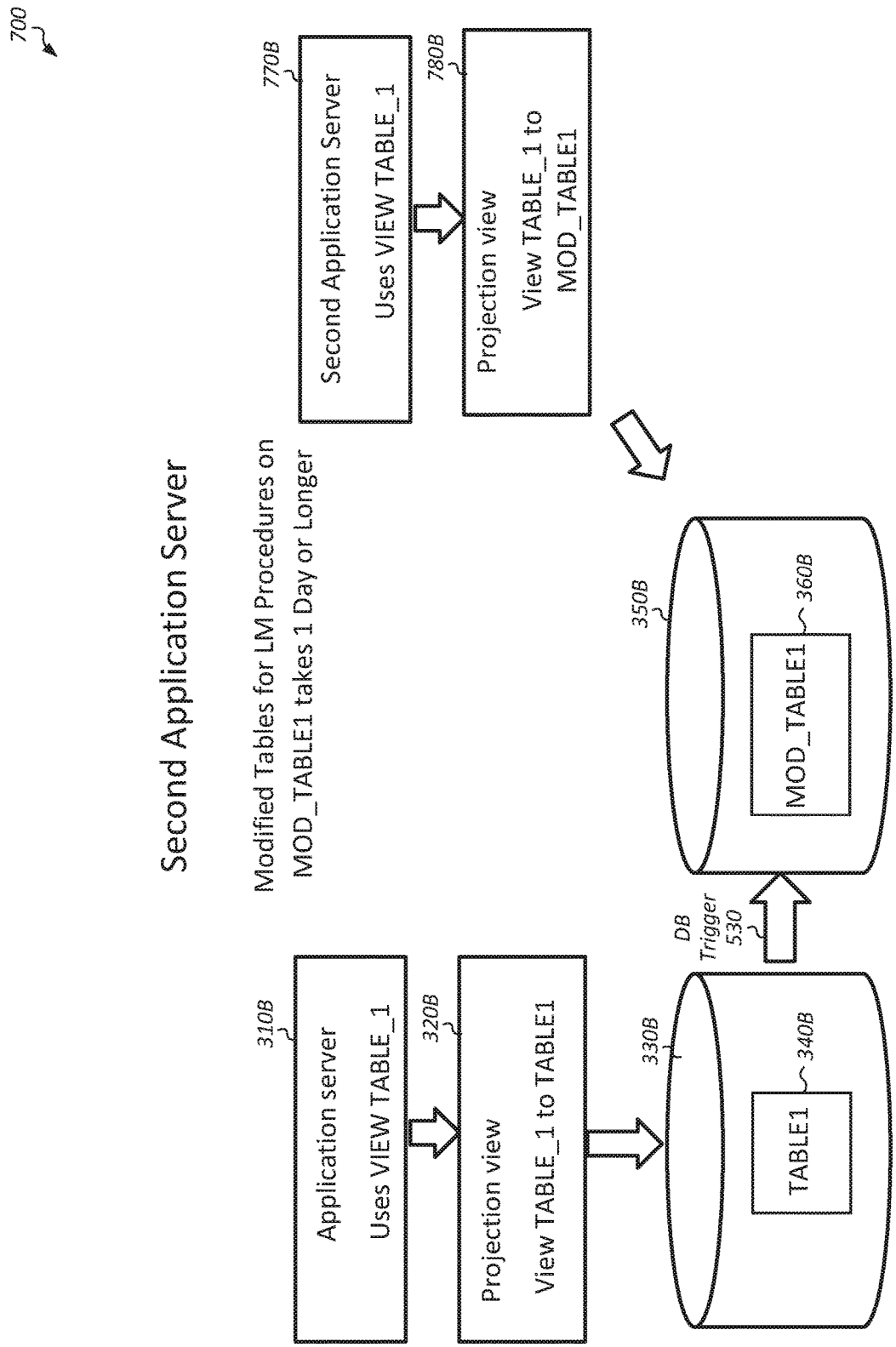
FIG. 7 illustrates a logical diagram of a database system including a second application server, in accordance with some example implementations of the current subject matter.

Referring now to FIG. 7, a logical diagram of a database system 700 including a second application server 770B is shown. Database system 700 is intended to represent an alternate implementation as compared to database system 300B (of FIG. 4). In contrast to database system 300B, database system 700 includes a second application server 770B which performs the modification operation on the original set of tables 340B to create the modified set of tables 360B. The other components of database system 700, such as application server 310B, projection view 320B, databases 330B, database 350B, and database trigger 530 are the equivalent components to the corresponding components of database systems 300B (of FIGS. 4) and 500 (of FIG. 5).

In the embodiment illustrated in FIG. 7, the first application server 310B is unaware that the modification operation is being performed, and the first application server 310 continues to access the original set of tables 340B via projection view 320B. While the first application server 310B is able to continue accessing the original set of tables 340B, the second application server 770B performs the modification operation via projection view 780B which maps "TABLE_1" to "MOD_TABLE1".

Figure 8:
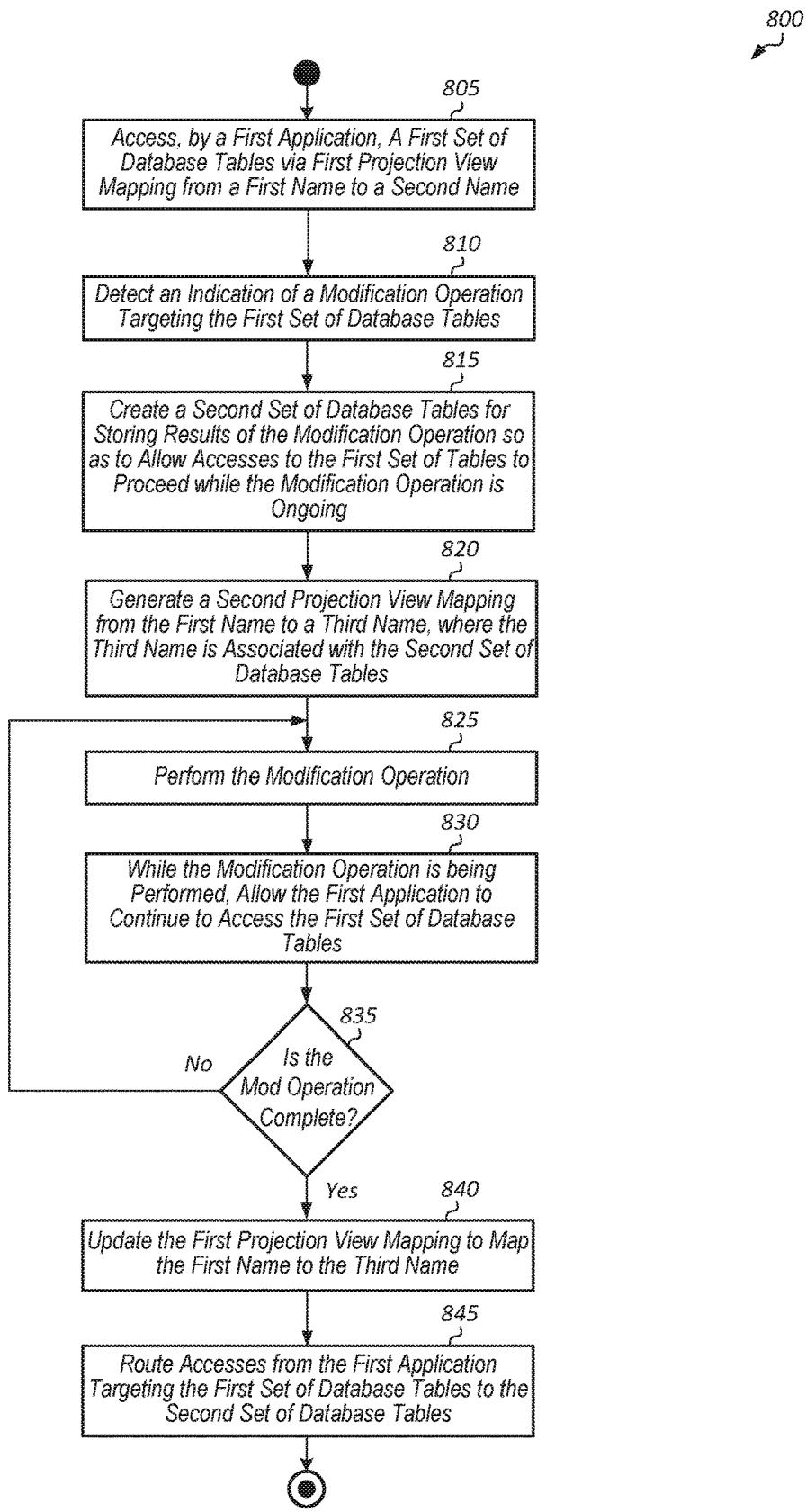
FIG. 8 illustrates an example of a process for performing a modification operation on a set of data tables, in accordance with some example implementations of the current subject matter.

Turning now to FIG. 8, a process is depicted for performing a modification operation on a set of data tables, in accordance with one or more embodiments of the current subject matter. A first application accesses a first set of database tables via a first projection view mapping from a first name to a second name (block 805). In an example, the first set of database tables may store the business configuration data for an ERP system. In other examples, the first set of database tables may store data associated with other types of applications and/or configurations. It is noted that the first name and the second name may also be referred to herein as the first identifier (ID) and the second ID, respectively. The first name is how the first application identifies the first set of database tables, and the second name is how the first projection view identifies and locates the first set of database tables. The first projection view adds a layer of indirection between the first application and the first set of database tables, with the layer of indirection enabling parallel execution of multiple workloads targeting the first set of database tables, while the first set of database tables are being modified, without these multiple workloads interfering with one another.

While the first application uses the first projection view to access the first set of database tables, an indication of a modification operation targeting the first set of database tables is detected (block 810). In response to detecting the indication of the modification operation, a second set of database tables are created for storing results of the modification operation so as to allow accesses to the first set of tables to proceed while the modification operation is ongoing (block 815). In an example, the second set of database tables are created as a cloned version of the first set of database tables. Also in response to detecting the indication of the modification operation, a second projection view mapping from the first name to a third name is generated, where the third name is associated with the second set of database tables (block 820). In an example, data from the first set of database tables is copied to the second set of database tables, and then the modification operation is performed on the second set of database tables. In this example, the second set of database tables is an exact copy of the first set of database tables prior to the modification operation being initiated. In another example, data is read from the first set of database tables, the data is modified, and then the modified data is stored in the second set of database tables. In other examples, other procedures with other steps and/or other orders of steps for creating the second set of database tables and performing the modification operation may be utilized.

Next, after the second set of database tables are created, the modification operation is performed (block 825). While the modification operation is being performed, the first application is allowed to continue to access the first set of database tables (block 830). When the modification operation is completed (conditional block 835, "yes" leg), then first projection view mapping is updated to map from the first name to the third name (block 840). After the first projection view mapping is updated, accesses from the first application targeting the first set of database tables will now be routed to the second set of database tables (block 845). From the first application's point of view, nothing has changed, and the first application can continue to access the second set of database tables, which have now replaced the first set of database tables, without any downtime. After block 845, method 800 may end.

Figure 9:
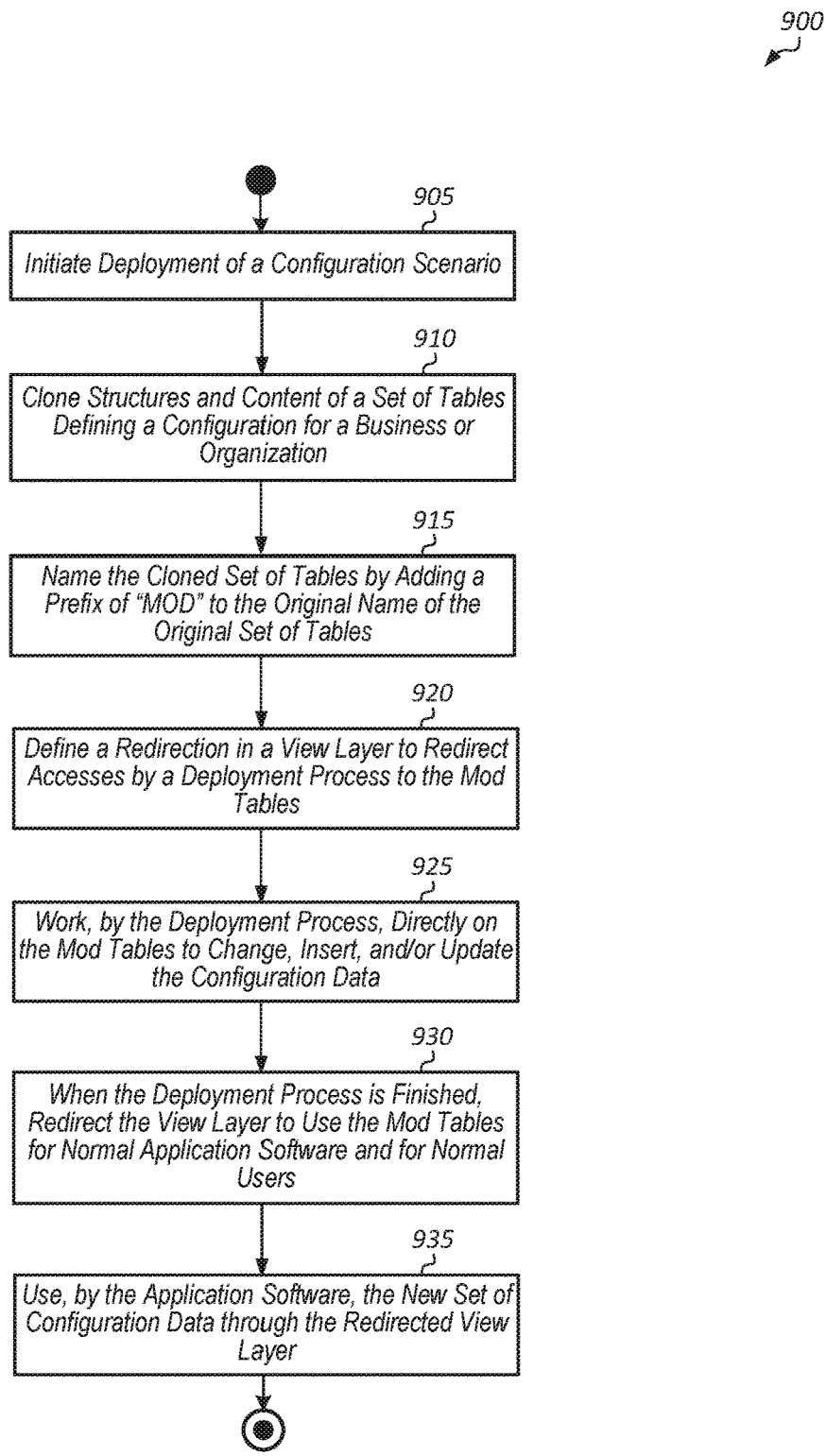
FIG. 9 illustrates an example of a process for updating configuration data in an ERP system, in accordance with some example implementations of the current subject matter.

Referring now to FIG. 9, a process is depicted for updating configuration data in an ERP system, in accordance with one or more embodiments of the current subject matter. At the beginning of the process, deployment of a configuration scenario is initiated (block 905). Next, structures and content of a set of tables defining a configuration for a business or organization are cloned (block 910). The cloned set of tables are named with a prefix of "MOD" added to the original name of the original set of tables (block 915). It is noted that the new set of tables may also be referred to as the modified set of tables or the "mod tables" for short. Also, a redirection is defined in a view layer to redirect accesses by a deployment process to the mod tables (block 920).

The deployment process works directly on the mod tables to change, insert, and/or update the configuration data (block 925). When the deployment process is finished, the view layer is redirected to use the mod tables for normal application software and for normal users (block 930). In an example, the view layer is redirected by setting a single flag in one control database table. Next, the application software uses the new set of configuration data through the redirected view layer (block 935). After block 935, method 900 ends.

Figure 10A:
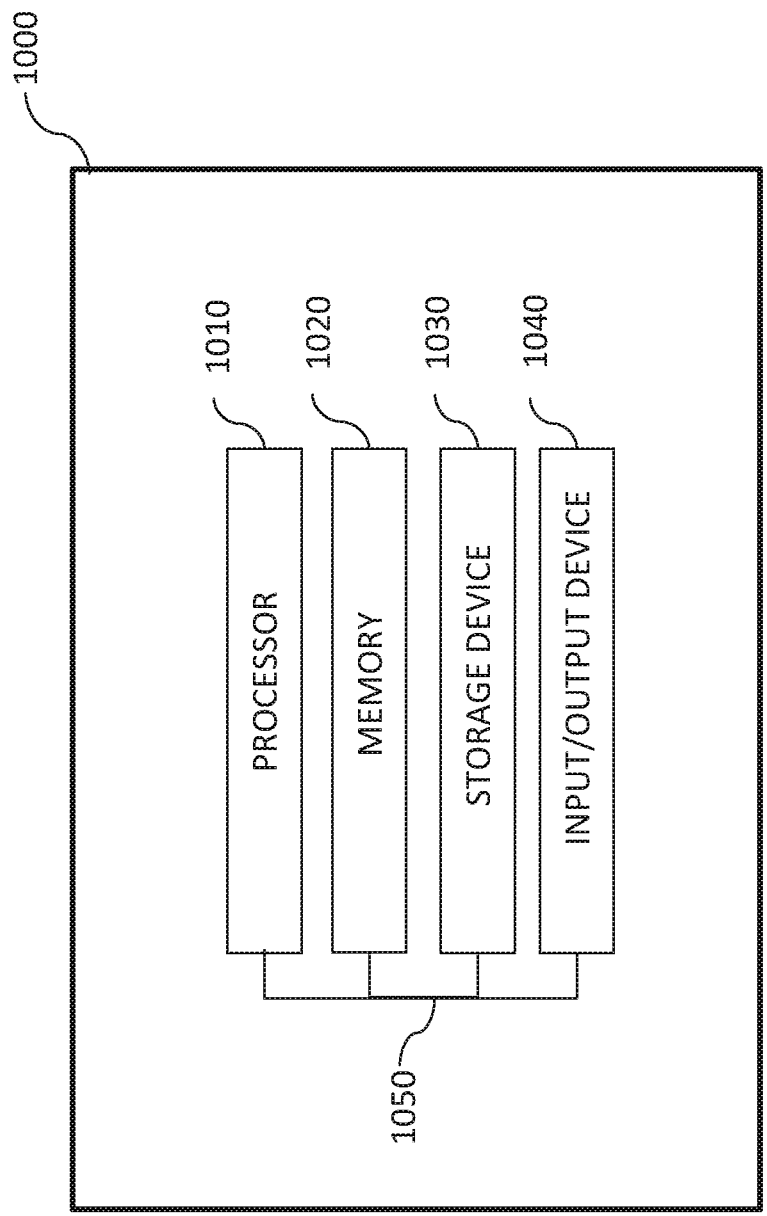
FIG. 10A depicts an example of a system, in accordance with some example implementations of the current subject matter.

In some implementations, the current subject matter may be configured to be implemented in a system 1000, as shown in FIG. 10A. The system 1000 may include a processor 1010, a memory 1020, a storage device 1030, and an input/output device 1040. Each of the components 1010, 1020, 1030 and 1040 may be interconnected using a system bus 1050. The processor 1010 may be configured to process instructions for execution within the system 1000. In some implementations, the processor 1010 may be a single-threaded processor. In alternate implementations, the processor 1010 may be a multi-threaded processor. The processor 1010 may be further configured to process instructions stored in the memory 1020 or on the storage device 1030, including receiving or sending information through the input/output device 1040. The memory 1020 may store information within the system 1000. In some implementations, the memory 1020 may be a computer-readable medium. In alternate implementations, the memory 1020 may be a volatile memory unit. In yet some implementations, the memory 1020 may be a non-volatile memory unit. The storage device 1030 may be capable of providing mass storage for the system 1000. In some implementations, the storage device 1030 may be a computer-readable medium. In alternate implementations, the storage device 1030 may be a floppy disk device, a hard disk device, an optical disk device, a tape device, non-volatile solid state memory, or any other type of storage device. The input/output device 1040 may be configured to provide input/output operations for the system 1000. In some implementations, the input/output device 1040 may include a keyboard and/or pointing device. In alternate implementations, the input/output device 1040 may include a display unit for displaying graphical user interfaces.

Figure 10B:
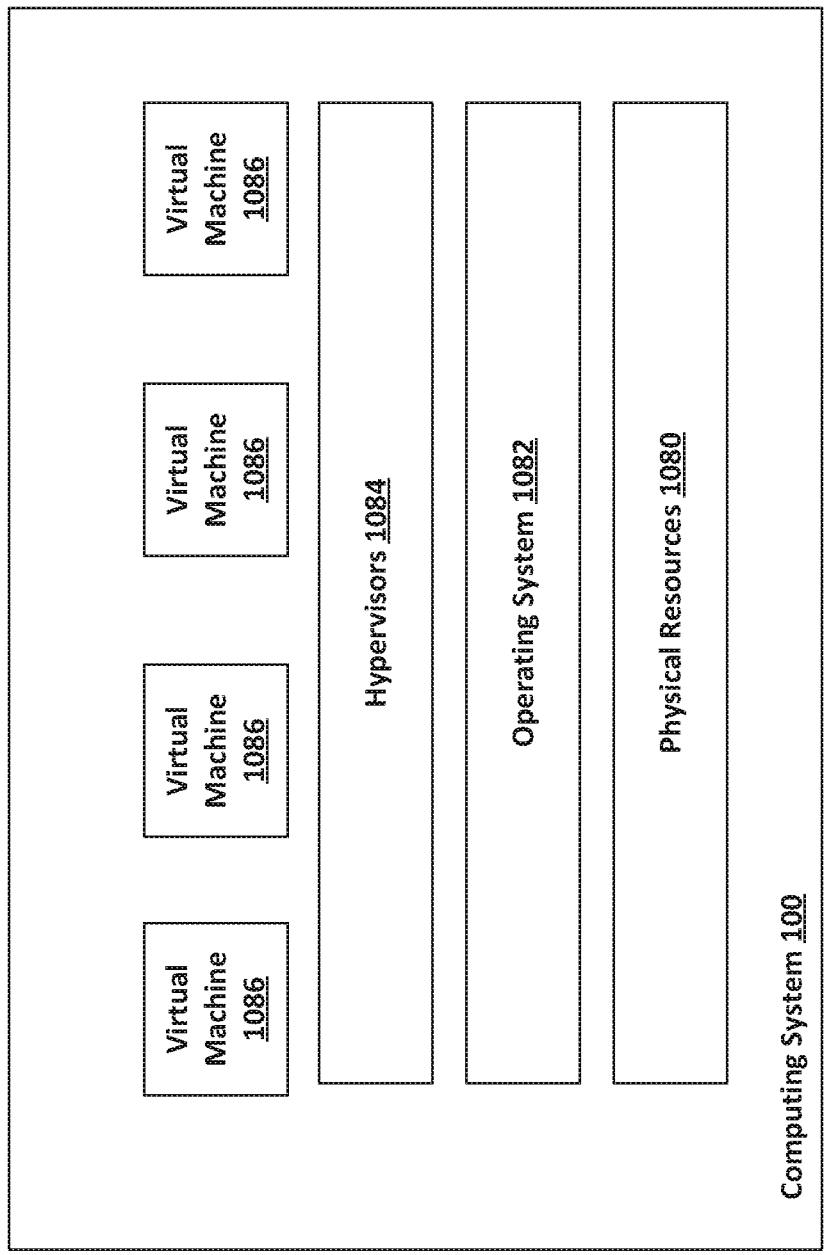
FIG. 10B depicts another example of a system, in accordance with some example implementations of the current subject matter.

FIG. 10B depicts an example implementation of the computing system 100 (of FIG. 1). The computing system 100 may be implemented using various physical resources 1080, such as at least one or more hardware servers, at least one storage, at least one memory, at least one network interface, and the like. The computing system 100 may also be implemented using infrastructure, as noted above, which may include at least one operating system 1082 for the physical resources 1080 and at least one hypervisor 1084 (which may create and run at least one virtual machine 1086). For example, each multitenant application may be run on a corresponding virtual machine 1086.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method comprising: accessing, by a first application, a first set of database tables via a first projection view mapping from a first name to a second name; detecting an indication of a modification operation targeting the first set of database tables; creating a second set of database tables for storing results of the modification operation; responsive to detecting a completion of the modification operation: remapping the first projection view from the first name to a third name, wherein the third name is associated with the second set of database tables; and accessing, by the first application, the second set of database tables via the first projection view mapping from the first name to the third name.

Example 2: The computer-implemented method of Example 1, wherein the second set of database tables are a modified version of the first set of database tables.

Example 3: The computer-implemented method of any of Examples 1-2, wherein accesses targeting the first set of tables subsequent to the completion of the modification operation are redirected to the second set of tables.

Example 4: The computer-implemented method of any of Examples 1-3, further comprising continuing to enable access to the first set of database tables via the first projection view mapping from the first name to the second name while the modification operation is ongoing.

Example 5: The computer-implemented method of any of Examples 1-4, further comprising generating a second projection view mapping from the first name to the third name.

Example 6: The computer-implemented method of any of Examples 1-5, further comprising accessing, by a second application, the second set of tables via the second projection view mapping from the first name to the third name for performing the modification operation.

Example 7: The computer-implemented method of any of Examples 1-6, wherein accesses by the first application to the first set of database tables via the first projection view mapping from the first name to the second name occur in parallel with accesses by the second application to the second set of tables via the second projection view mapping from the first name to the third name for performing the modification operation.

Example 8: The computer-implemented method of any of Examples 1-7, wherein the modification operation is a lifecycle management operation.

Example 9: The computer-implemented method of any of Examples 1-8, further comprising generating a database trigger to cause changes made to the first set of database tables to also be made to the second set of database tables while the modification operation is ongoing.

Example 10: The computer-implemented method of any of Examples 1-9, wherein the third name is generated by prepending a MOD prefix to the second name.

Example 11: A system comprising: at least one processor; and at least one memory storing instructions that, when executed by the at least one processor, cause operations comprising: accessing a first set of database tables via a first projection view mapping from a first name to a second name; detecting an indication of a modification operation targeting the first set of database tables; creating a second set of database tables for storing results of the modification operation; responsive to detecting a completion of the modification operation: remapping the first projection view from the first name to a third name, wherein the third name is associated with the second set of database tables; and accessing the second set of database tables via the first projection view mapping from the first name to the third name.

Example 12: The system of Example 11, wherein the second set of database tables are a modified version of the first set of database tables.

Example 13: The system of any of Examples 11-12, wherein accesses targeting the first set of tables subsequent to the completion of the modification operation are redirected to the second set of tables.

Example 14: The system of any of Examples 11-13, wherein the operations further comprise continuing to enable access to the first set of database tables via the first projection view mapping from the first name to the second name while the modification operation is ongoing.

Example 15: The system of any of Examples 11-14, wherein the operations further comprise generating a second projection view mapping from the first name to the third name.

Example 16: The system of any of Examples 11-15, wherein the operations further comprise accessing the second set of tables via the second projection view mapping from the first name to the third name for performing the modification operation.

Example 17: The system of any of Examples 11-16, wherein accesses by a first application to the first set of database tables via the first projection view mapping from the first name to the second name occur in parallel with accesses by a second application to the second set of tables via the second projection view mapping from the first name to the third name for performing the modification operation.

Example 18: The system of any of Examples 11-17, wherein the modification operation is a lifecycle management operation.

Example 19: The system of any of Examples 11-18, wherein the third name is generated by prepending a MOD prefix to the second name.

Example 20: A non-transitory computer readable medium storing instructions, which when executed by at least one data processor, cause operations comprising: accessing, by a first application, a first set of database tables via a first projection view mapping from a first name to a second name; detecting an indication of a modification operation targeting the first set of database tables; creating a second set of database tables for storing results of the modification operation; responsive to detecting a completion of the modification operation: remapping the first projection view from the first name to a third name, wherein the third name is associated with the second set of database tables; and accessing, by the first application, the second set of database tables via the first projection view mapping from the first name to the third name.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method comprising:
    accessing, by a first application, a first set of database tables via a first projection view mapping from a first name to a second name;
    detecting an indication of a modification operation targeting the first set of database tables;
    creating a second set of database tables for storing results of the modification operation, wherein the second set of database tables are a modified version of the first set of database tables;
    responsive to detecting a completion of the modification operation:
    remapping the first projection view from the first name to a third name, wherein the third name is associated with the second set of database tables; and
    accessing, by the first application, the second set of database tables via the first projection view mapping from the first name to the third name.

2. The computer-implemented method of claim 1, wherein accesses targeting the first set of tables subsequent to the completion of the modification operation are redirected to the second set of tables.

3. The computer-implemented method of claim 1, further comprising continuing to enable access to the first set of database tables via the first projection view mapping from the first name to the second name while the modification operation is ongoing.

4. The computer-implemented method of claim 3, further comprising generating a second projection view mapping from the first name to the third name.

5. The computer-implemented method of claim 4, further comprising accessing, by a second application, the second set of tables via the second projection view mapping from the first name to the third name for performing the modification operation.

6. The computer-implemented method of claim 5, wherein accesses by the first application to the first set of database tables via the first projection view mapping from the first name to the second name occur in parallel with accesses by the second application to the second set of tables via the second projection view mapping from the first name to the third name for performing the modification operation.

7. The computer-implemented method of claim 1, wherein the modification operation is a lifecycle management operation.

8. The computer-implemented method of claim 1, further comprising generating a database trigger to cause changes made to the first set of database tables to also be made to the second set of database tables while the modification operation is ongoing.

9. The computer-implemented method of claim 1, wherein the third name is generated by prepending a MOD prefix to the second name.

10. A system comprising:
    at least one processor; and
    at least one memory storing instructions that, when executed by the at least one processor, cause operations comprising:
        accessing a first set of database tables via a first projection view mapping from a first name to a second name;
        detecting an indication of a modification operation targeting the first set of database tables;
        creating a second set of database tables for storing results of the modification operation, wherein the second set of database tables are a modified version of the first set of database tables;
        responsive to detecting a completion of the modification operation:
        remapping the first projection view from the first name to a third name, wherein the third name is associated with the second set of database tables; and
        accessing the second set of database tables via the first projection view mapping from the first name to the third name.

11. The system of claim 10, wherein accesses targeting the first set of tables subsequent to the completion of the modification operation are redirected to the second set of tables.

12. The system of claim 10, wherein the operations further comprise continuing to enable access to the first set of database tables via the first projection view mapping from the first name to the second name while the modification operation is ongoing.

13. The system of claim 12, wherein the operations further comprise generating a second projection view mapping from the first name to the third name.

14. The system of claim 13, wherein the operations further comprise accessing the second set of tables via the second projection view mapping from the first name to the third name for performing the modification operation.

15. The system of claim 14, wherein accesses by a first application to the first set of database tables via the first projection view mapping from the first name to the second name occur in parallel with accesses by a second application to the second set of tables via the second projection view mapping from the first name to the third name for performing the modification operation.

16. The system of claim 10, wherein the modification operation is a lifecycle management operation.

17. The system of claim 10, wherein the third name is generated by prepending a MOD prefix to the second name.

18. A non-transitory computer readable medium storing instructions, which when executed by at least one data processor, cause operations comprising:

accessing, by a first application, a first set of database tables via a first projection view mapping from a first name to a second name;
detecting an indication of a modification operation targeting the first set of database tables;
creating a second set of database tables for storing results of the modification operation, wherein the second set of database tables are a modified version of the first set of database tables;
responsive to detecting a completion of the modification operation:
remapping the first projection view from the first name to a third name, wherein the third name is associated with the second set of database tables; and
accessing, by the first application, the second set of database tables via the first projection view mapping from the first name to the third name.

* * * * *